United States Patent [19]

Brennan

[11] Patent Number: 5,149,126
[45] Date of Patent: Sep. 22, 1992

[54] TRUCK MIXER MOUNTING FRAME
[75] Inventor: George A. Brennan, La Habra Heights, Calif.
[73] Assignee: Rexworks, Inc., Milwaukee, Wis.
[21] Appl. No.: 795,242
[22] Filed: Nov. 15, 1991

Related U.S. Application Data

[63] Continuation of Ser. No. 487,908, Mar. 5, 1990, abandoned.

[51] Int. Cl.$^5$ .............................................. B28C 5/20
[52] U.S. Cl. .................................... 280/704; 366/62; 248/582
[58] Field of Search ...................... 366/62, 54, 63, 220; 248/582, 671, 672, 676; 280/800, 781, 704; 180/209

[56] References Cited

U.S. PATENT DOCUMENTS

| | | | |
|---|---|---|---|
| 875,254 | 12/1907 | Gartshore | 280/800 |
| 2,722,408 | 11/1955 | Hilkemeier | 366/63 |
| 3,603,565 | 9/1971 | Johnson | 366/62 |
| 4,575,254 | 3/1986 | Johnston | 366/62 |
| 4,762,421 | 8/1988 | Christenson et al. | 366/54 |

FOREIGN PATENT DOCUMENTS 22446  9/1917  Denmark ........................... 280/800

Primary Examiner—Charles A. Marmor
Assistant Examiner—Karin Tyson
Attorney, Agent, or Firm—Andrus, Sceales, Starke & Sawall

[57] ABSTRACT

A concrete mixer truck frame is distorted when a concrete truck traverses a rough road and when the vehicle turns. Flexible mounting of pedestals which support the mixer drum accommodates distortion of the frame yet provides a rigid platform for the mixer drum. Each pedestal includes an upright frame with lower ends connected to side frame members with self aligning bearings. A central portion of a pedestal is flexibly connected to an upper part of a diagonal link with self aligning bearings. The truck frame includes "C" shaped cross members connected to the side frame members. A lower end of the diagonal link is flexibly connected to one of the cross members so that the load passes through the shear center of the "C" shaped cross member.

4 Claims, 4 Drawing Sheets

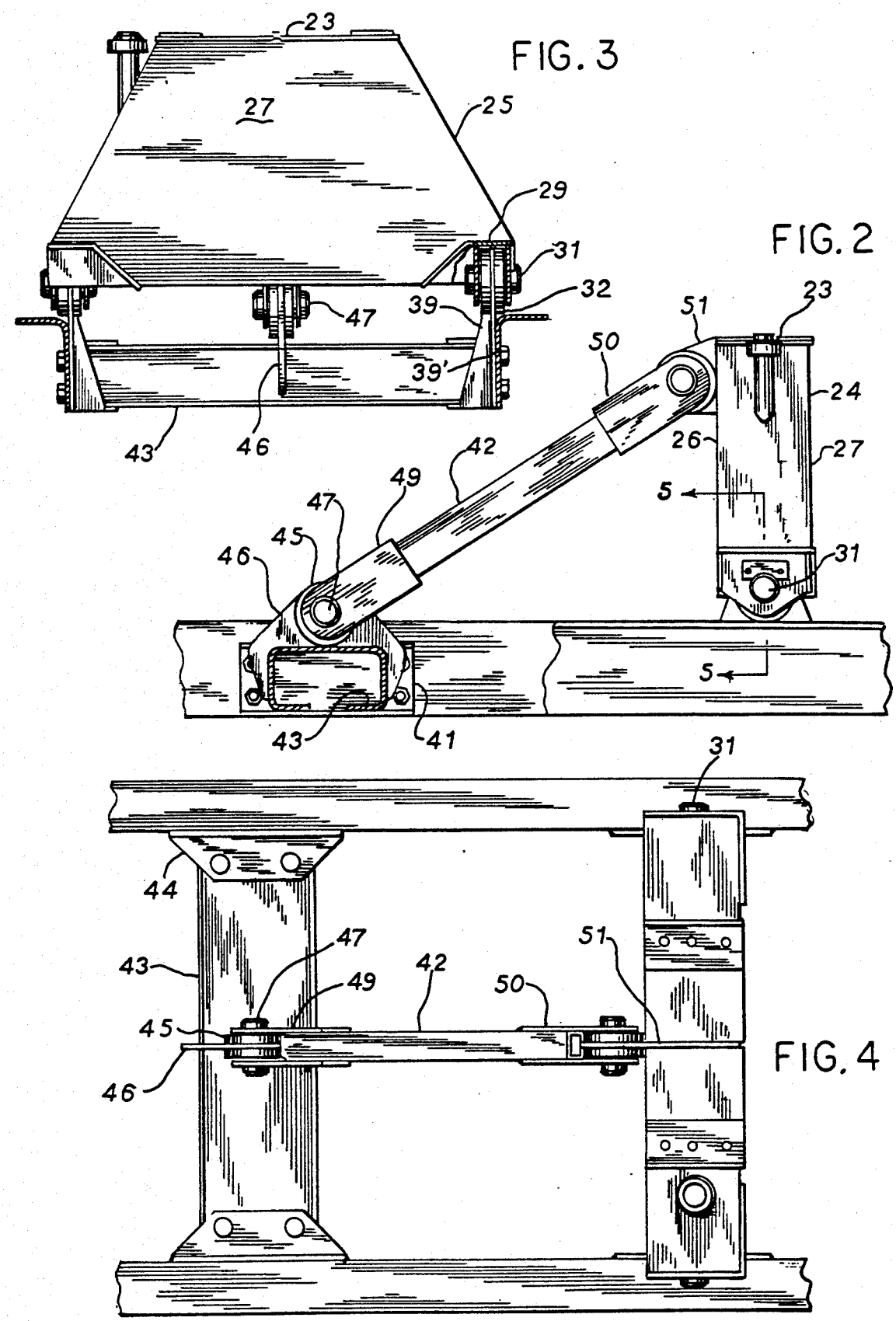

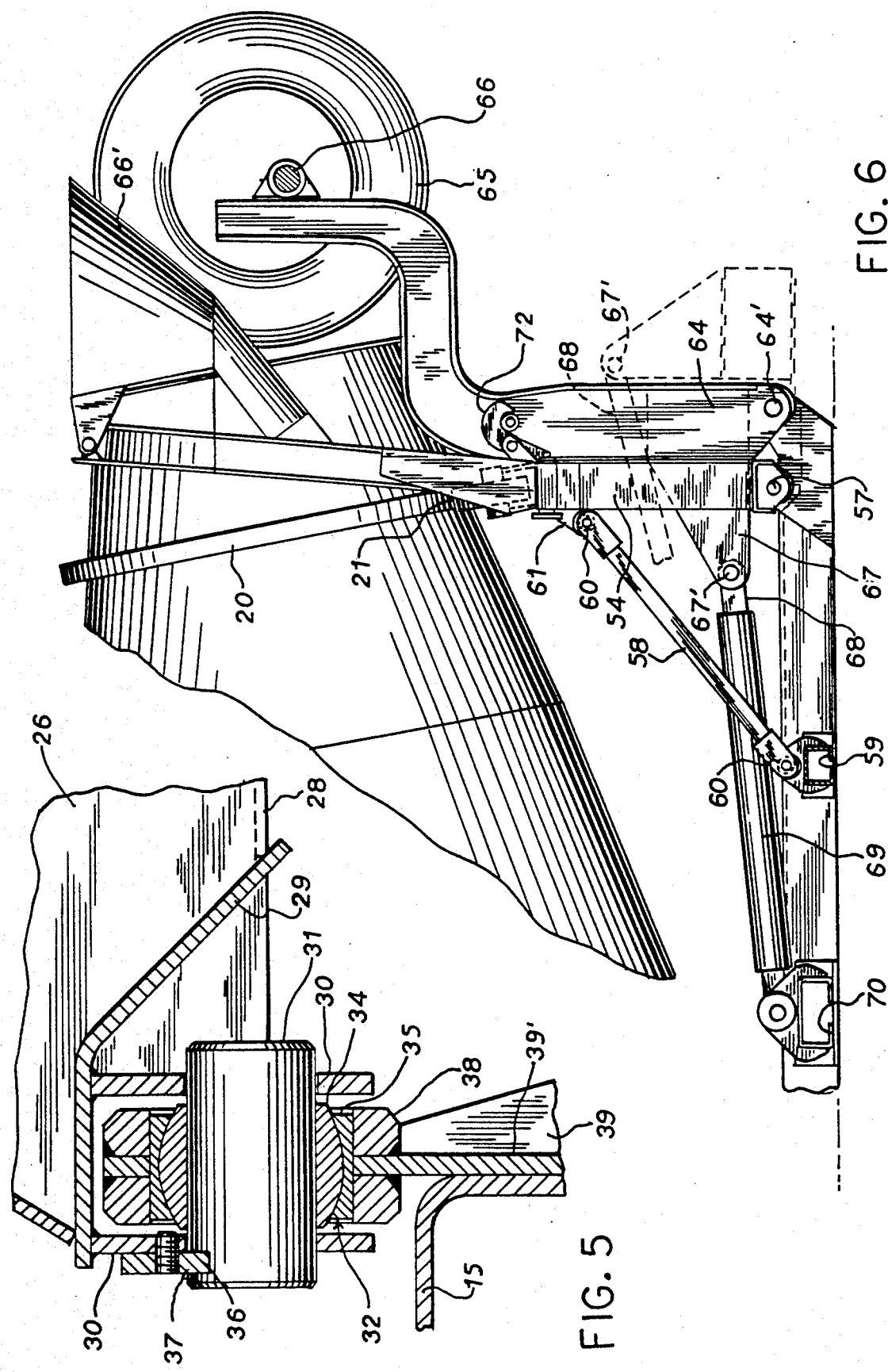

TRUCK MIXER MOUNTING FRAME

This application is a continuation of application Ser. No. 07/487,908, filed Mar. 5, 1990, now abandoned.

BACKGROUND AND SUMMARY OF THE INVENTION

This invention relates to the frame that is mounted on the truck and supports the drum and auxiliary apparatus of a transit concrete mixer.

In a conventional transit concrete mixer, the mixer drum rests on pedestals which are mounted on the side sills or rails of the truck. One of the pedestals supports the closed end of the drum and the other, the open end of the drum through which material is charged and discharged.

Drum rotating means are frequently connected to a trunnion which extends axially from the closed head of the drum. The opposite end of the drum is provided with a track that rests on rollers mounted on a pedestal of the frame. The rollers serve as a cradle for the portion of the drum which rests on them.

Both pedestals include crossmembers and uprights members disposed to perform their function of supporting the drum. Power from the truck is customarily used to rotate the drum while the truck is transporting the mixer, and the mixer is either used to mix or agitate the concrete in the drum.

Present mixer drums are very large and impose a substantial load on the truck frame. Due to road irregularities, the truck frame is subjected to various strains and distortions including twisting action which in turn twists portions of the pedestals.

In addition, there is an angular difference between the left and right rails of the truck under certain load conditions causing a scissor-like action between the rails. The pedestal mounting brackets of the front pedestal extending above the truck rails want to assume an angular difference to each other during such loads.

Another cause of distortion occurs during turning of the truck. The tandem rear axles on the truck cause considerable resistance to turning and lateral bending of the truck frame. This distortion is termed "laddering", i.e.; one rail of the truck gets ahead of the other rail.

It has been proposed to provide some flexibility in the mounting of the pedestals that support the drum. An example is the Johnson U.S. Pat. No. 4,575,254 issued Mar. 11, 1986, in which one of the pedestal ends is free to rotate. However, being mounted above the rails, this rotation does not accommodate the binding of the tubular cross member occasioned by frame distortions caused by the scissoring and laddering action of the truck rails.

According to the present invention, spherical ball joints are provided to mount the pedestal and permit frame distortions to occur without undue resistance. If the truck frame can "move" around the pedestals because of such mounting, the pedestals can be built as a rigid assembly without trying to restrain the truck frame movement. In the case of both pedestals, the present invention enables these pedestals to provide a flat and rigid platform on which the drum drive and roller mechanisms respectively, are mounted.

Each pedestal consists of an upright frame structure, the lower ends of which are connected to the side frame members by means of self aligning bearings. The central upper portion of the upright frame is connected by a diagonal link or strut to a separate cross member arranged forwardly thereof, the ends of the link being likewise connected by self-aligning bearings. By utilizing a "C" section as a cross member and arranging it so the shear center of the member can serve as the point of attachment of the lower end of the strut, the load path of the strut will pass through the shear center and will not cause the cross members to rotate.

This invention permits a lighter truck mixer frame design because it reduces the torsional reactionary forces that are carried by the truck chassis main rails laddering and scissoring under irregular road conditions. This is a decided advantage because any decrease in weight enables the mixer to haul larger concrete payloads without violating street or highway weight limits.

The invention is illustrated by the accompanying drawings wherein:

FIG. 2 is a side elevation of the front pedestal of the frame;

FIG. 3 is an end view taken along the plane of the line 3—3 in FIG. 1 of the pedestal shown in FIG. 2;

FIG. 4 is a plan view of the front pedestal;

FIG. 5 is an enlarged partial cross sectional view taken along the plane of the line 5—5 in FIG. 2 of the mounting of the self-aligning radial bushing used at pivot points of the front pedestal;

FIG. 6 is a side elevation of the rear pedestal of the frame, showing a tag axle extending from the rear thereof;

Figure 1:
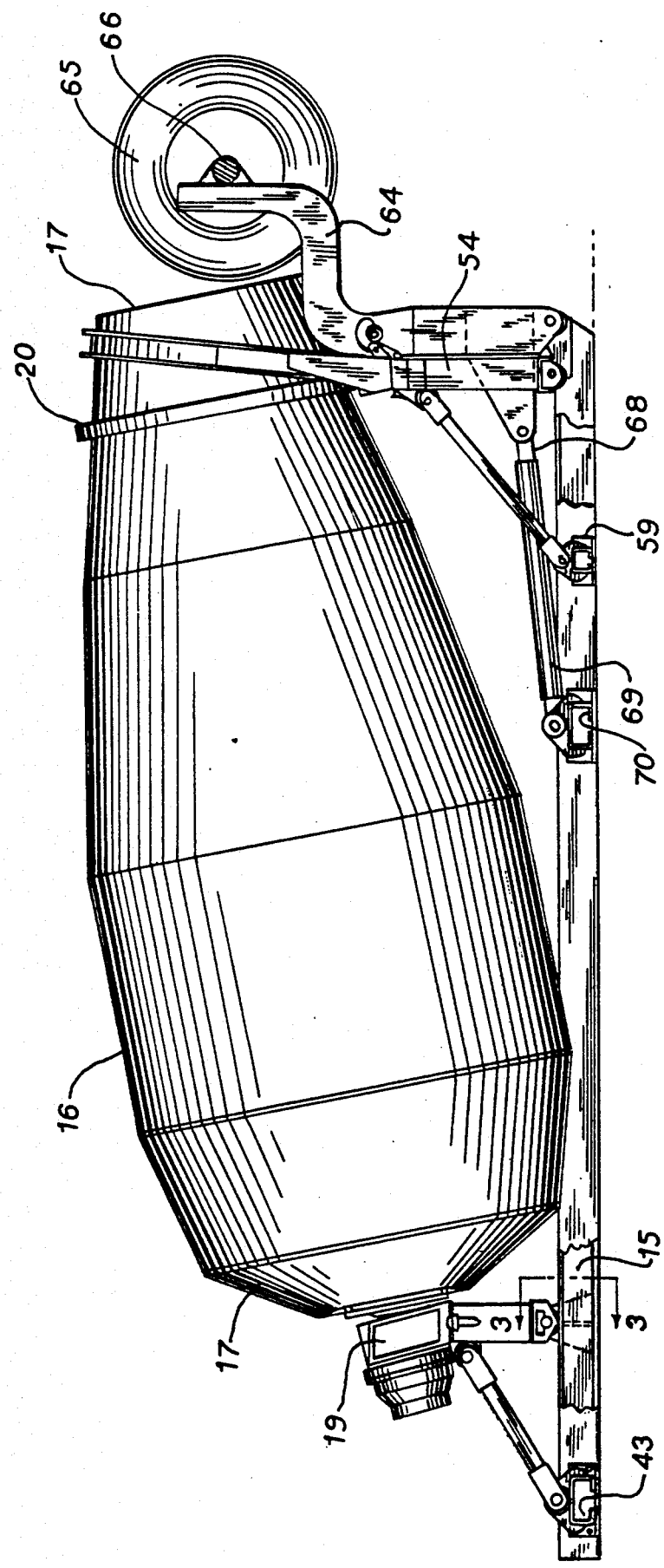
FIG. 1 is a side elevation of a truck mounted concrete mixer drum showing major frame elements.
Figure 7:
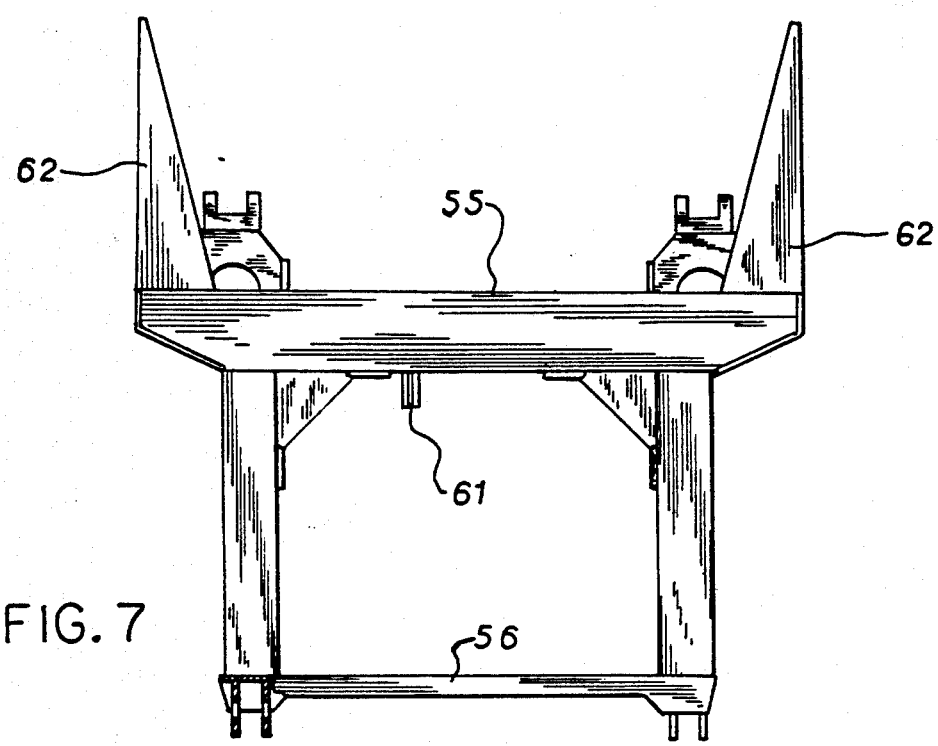
FIG. 7 is an end view of the rear pedestal with the tag axle removed.

As previously stated, the side rails of the truck usually extend for the full length of the truck on each side thereof. They may be of various shapes, such as channel sections with the open sides facing each other, or they may be I beams, or other shapes. A channel or I-beam provide a flat top surface on which the frame portion of the mixer rests and vertical side portions in which the same mixer portion may be bolted or otherwise secured.

In the drawings, the side frame sills of the mixer are designated by the number 15. These may be of various shapes, but in the present instance are "Z" shaped in cross section with the bottom section arranged to rest on the top of the truck rail. Single side sills may support both pedestals on each side of the mixer, or each pedestal may be supported by a separate side sill on each side of the pedestal.

As shown in FIG. 1, the mixer drum 16 has an inclined axis with the front lower end 17 of closed contour. The upper end 18 is open for charge and discharge of drum contents. The front end is supported by a transmission bearing 19 and includes gearing for driving a trunnion extending axially from the front end of the drum through the bearing. As shown best is FIG. 6, the rear or discharge end of the drum is provided with a track 20 which rests on rollers 21 supported by a pedestal at the rear portion of the mixer frame.

Transmission 19 has a flat lower base which rests on the flat upper surface 23 of the front pedestal 24 to which it may be bolted. Pedestal 24 has a diverging sides 25 and front and rear faces 26 and 27. As best shown in FIG. 5, the base 28 of pedestal 24 has upwardly extending end portions 29. Secured to the bottom faces of the portions 29 are downwardly disposed ears 30 through which the shafts or pins 31 of the spherical bearings 32 extend and are anchored. The ears 30 constitute leg portions, one of which is arranged over each sill 15 of the mixer frame.

Self-aligning spherical bearings 32 are used for supporting the leg portions 30. These bearings have a spherically shaped inner ring 34 fitted in a spherically shaped outer raceway 35 enabling substantial misalignment of the anchoring portions of the members. The faces are provided with seals to retain lubricant. The shafts are provided with keyways which are engaged by a keeper 37 bolted on the adjacent face of the ear 30. The outer raceway 35 is fitted into a steel tube 38 which is welded to the supporting bracket 39.

It will be noted that the bracket 39 has a vertical section 39' which lies flat against the vertical section of the side sill 15 to which it is rigidly attached. This results in the weight of the leg portion 30 being vertically over the vertical portion of the sill 15, thus avoiding any tendency of the sill 15 to be twisted by such weight.

Similiar mounting is provided for the self aligning bushing on each leg of the lower portion of the upright pedestal. The pedestal, being enclosed, may provide a suitable reservoir for the hydraulic transmission.

To maintain the front pedestal 24 in its upright position, a tubular strut or link 42 of the rectangular cross-section connects its upper central portion with a housing 46 located at the middle of a crossmember 43 arranged forwardly thereof. The cross member 43 is a "C" section, with the open side on the bottom and with the ends arranged to abut the inner sides of the rails 15. Brackets 44 bolted to the inner sides of the rails 15, extending over the section 43, are welded to the upper surface of the section to form a rigid connection. The use of the "C" section cross member 43 provides a structure which is strong as a beam, but weak torsionally.

Torsion force on the cross member is minimized by connecting the lower end of the strut 42 to a portion of the bracket 46 which is above the middle of the closed face of the cross member. The force of the load path which the strut exerts on the cross member passes through the shear center of the "C" section. Accordingly, there is minimum load tending to divert the "C" section and buckling of the member where the cross member is attached to the frame angle is avoided.

The lower end of the strut 42 is provided with the spherical bearing 45, the outer race of which is retained in the housing 46 extending around the upper surfaces of the cross member 43. The shaft 47 extending through the inner bearing race is anchored between the lower portions of the fitting 49 which encloses and is rigidly connected to the lower end of the strut 42.

The upper end of the strut 42 is provided with a similiar fitting 50 supporting the inner race of the radial bearing. The latter is retained in a bracket 51 mounted on the upper forward portion of the pedestal 24. Similiar spherical bearings are provided at each end of the strut 42. These bearings may be the same or similar to bearings 32 at the lower ends of the pedestal, details of which have already been described. With the arrangement disclosed, substantial side flexing of the ends of the strut is provided for, there being ample clearance between the housing for the bearing and the strut connection for this purpose.

The mounting for the rear pedestal 54 which supports the drum rollers 21 is substantially similiar to the mounting of the front pedestal. Again, an upright frame member is provided, which includes upper cross members 55 and lower cross member 56. The lower ends of the pedestal 54 are provided with spherical bearings 57 which may be mounted in the same manner as bearings 32 supporting the front pedestal 24. The upper end of the rear pedestal is connected by a strut 58 to a forwardly disposed cross member 59, the ends of the strut having spherical bearings 60 similiar to bearings 45 provided at the ends of the strut connected to the forward pedestal 24. Bracket 61 mounted on the upper forward portion of the rear pedestal form the connection to the upper end of the strut. The upper cross member 55 extends outwardly to provide a ledge 62 on which the rollers 21 are mounted, the upper end of the drum being cradled between such rollers.

Figure 8:
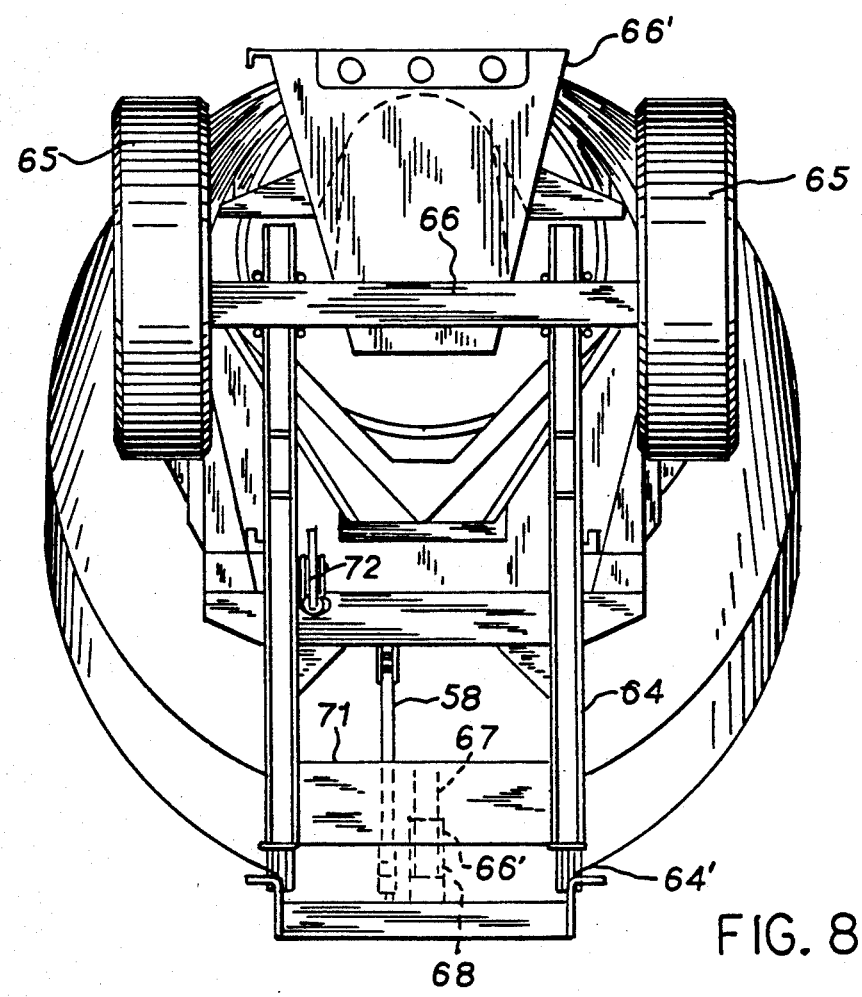
FIG. 8 is an end view of the mixer with the tag axle mounted on the mixer and in elevated position.

When the truck mixer is provided with an auxiliary axle to relieve some of the weight on the wheels as shown in U.S. Pat. No. 4,084,833 issued Apr. 18, 1978, the rear mixer pedestal is somewhat modified. FIGS. 6 and 8 show a carriage 64 pivotally mounted at 64' behind the rear upright pedestal 54. Wheels 65 located at the extreme end of carriage 64 are supported by an axle 66 extending transversely across the carriage. The wheels 65 extends on either side of the hopper when the carriage is in an upright position. As shown, the carriage has cross member 71 to which a forward bracket 67 is connected. Bracket 67 in turn is connected by means of a spherical bearing at 67' to one end of the piston 68 operating within cylinder 69, the forward end of which is connected by a spherical bearing to a cross member 70. Hydraulic power is furnished from the truck to extend the cylinder and lower the carriage to where the wheels 65 rest on the roadway. Further pressure from the piston exerts whatever force is desired to increase the load on wheels 65 and relieve pressure on the other truck wheels. When the truck is loaded and weight is being carried by the auxiliary axle, the mounting of the carriage by the spherical bearings has advantages similiar to the mounting of the front and rear pedestals. Of course, when the truck has delivered its load and is running empty, the carriage is elevated and retained by the hook 72 extending from the rear portion of the pedestal 54.

If the truck mixer is provided with auxiliary axle 66, the cylinder 69 is connected to a medial portion of the carriage and in this case, the strut connecting the rear pedestal to the cross member 59, is slightly offset on one side of center to avoid interference with the cylinder 69. With the conventional truck mixer, which has no auxiliary axle carriage, the strut 58 is centrally located.

The invention having been described what is claimed is:

1. In a transit concrete mixer truck having a concrete mixer drum rotatably mounted on front and rear pedestals each pedestal including two leg portions supported on a truck frame having a pair of spaced apart side sills, the improvement comprising a mounting assembly for at least one of the pedestals wherein each support for the two leg portions of the pedestal includes universally moveable connections disposed between the leg portions and the side sills whereby the leg portions of the pedestal are relieved of strains imposed by distortion of the truck frame;

a "C" shaped cross member extending crosswise between and secured at its ends to the side sills at a location spaced from said pedestal, the open side of the "C" shaped cross member facing downwardly; and an inclined force transmitting strut disposed between the side sills and connected by a universally moveable connection at its lower end to a central portion of said cross member and by a universally moveable connection at its upper end to a central portion of said pedestal, the point of securement between the lower end of the strut and the cross member being offset so that forces applied by the strut to the cross member pass through the shear center of the cross member whereby the connection between the ends of the cross member and the sills are relieved of twisting movement.

2. The mounting assembly of claim 1 wherein the connection between the strut and the cross member includes a bracket having means for connecting the lower end of the strut to the bracket arranged above the cross member.

3. The mounting assembly of claim 2 wherein the universally moveable connections are self-aligning, radial bushings.

4. The mounting assembly of claim 3 further including a carriage for supporting an auxiliary truck axle at its extremity, said carriage having a pair of leg portions each connected to a self-aligning radial bushing mounted on each of the side sills, a transverse "C" shaped beam extending crosswise between and secured at its ends to the side sills at a location spaced from said carriage leg potions, and an extensible cylinder for moving the carriage to position the carriage and axle between an elevated non-load carrying position and a lowered load carrying position, and self-aligning radial bushings connecting opposite ends of the cylinder to the cross beam and the carriage.

* * * * *

UNITED STATES PATENT AND TRADEMARK OFFICE
CERTIFICATE OF CORRECTION

PATENT NO. : 5,149,126

DATED : September 22, 1992

INVENTOR(S) : George A. Brennan

It is certified that error appears in the above-identified patent and that said Letters Patent is hereby corrected as shown below:

Claim 4                     Delete "potions" and substitute
Column 6, Line 13           therefore --- portions ---

Signed and Sealed this

Twenty-first Day of September, 1993

Attest:

BRUCE LEHMAN

*Attesting Officer*     *Commissioner of Patents and Trademarks*